United States Patent
Wozniak et al.

(10) Patent No.: US 6,436,209 B1
(45) Date of Patent: Aug. 20, 2002

(54) METHOD OF PRODUCING A ROAD WHEEL FOR A TRACK VEHICLE

(75) Inventors: Johannes Wozniak; Wilfried Spintig, both of Lippstadt (DE)

(73) Assignee: Thyssen Krupp AG, Dusseldorf (DE)

( * ) Notice: Subject to any disclaimer, the term of this patent is extended or adjusted under 35 U.S.C. 154(b) by 0 days.

(21) Appl. No.: 09/688,603

(22) Filed: Oct. 16, 2000

(30) Foreign Application Priority Data

Oct. 15, 1999 (EP) .............................. 99120499

(51) Int. Cl.⁷ .............................. C21D 9/34; C21D 8/00
(52) U.S. Cl. .................. 148/583; 29/894.324; 29/894.3
(58) Field of Search ...................... 148/583; 29/894.324, 29/894.325, 894.3

(56) References Cited

U.S. PATENT DOCUMENTS 4,572,587 A   2/1986   Komp
5,899,516 A * 5/1999   Fujimura et al. ............ 420/104

FOREIGN PATENT DOCUMENTS

| DE | 43 23 167 C | 5/1994 |
| DE | 197 23 073 A | 12/1998 |
| EP | 0 111 048 | 6/1984 |

* cited by examiner

Primary Examiner—Deborah Yee
(74) Attorney, Agent, or Firm—Herbert Dubno

(57) ABSTRACT

A road wheel for a track laying vehicle is made by initially roll pressing and projection drawing a planar disk of temperable steel into a blank having a cylindrical portion, a planar hub portion and an intermediate portion bridging the hub and peripheral projection. Prior to machining at least of the intermediate portions, the blank is tempered and thereby increased in size. The blank is reshaped following the tempering and prior to machining to the original blank shape and is then machined.

6 Claims, 2 Drawing Sheets

METHOD OF PRODUCING A ROAD WHEEL FOR A TRACK VEHICLE

FIELD OF THE INVENTION

Figure 1:
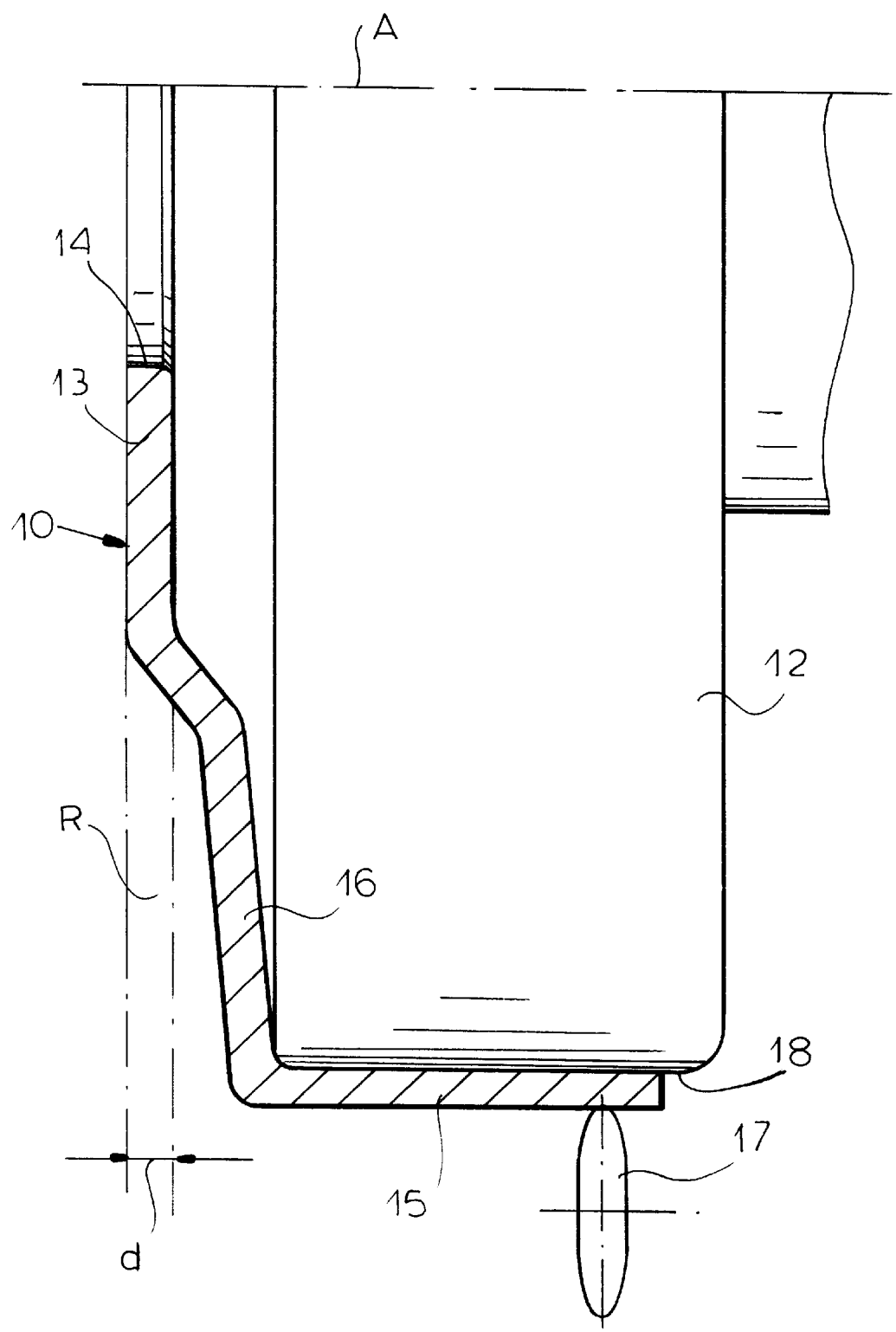
Figure 2:
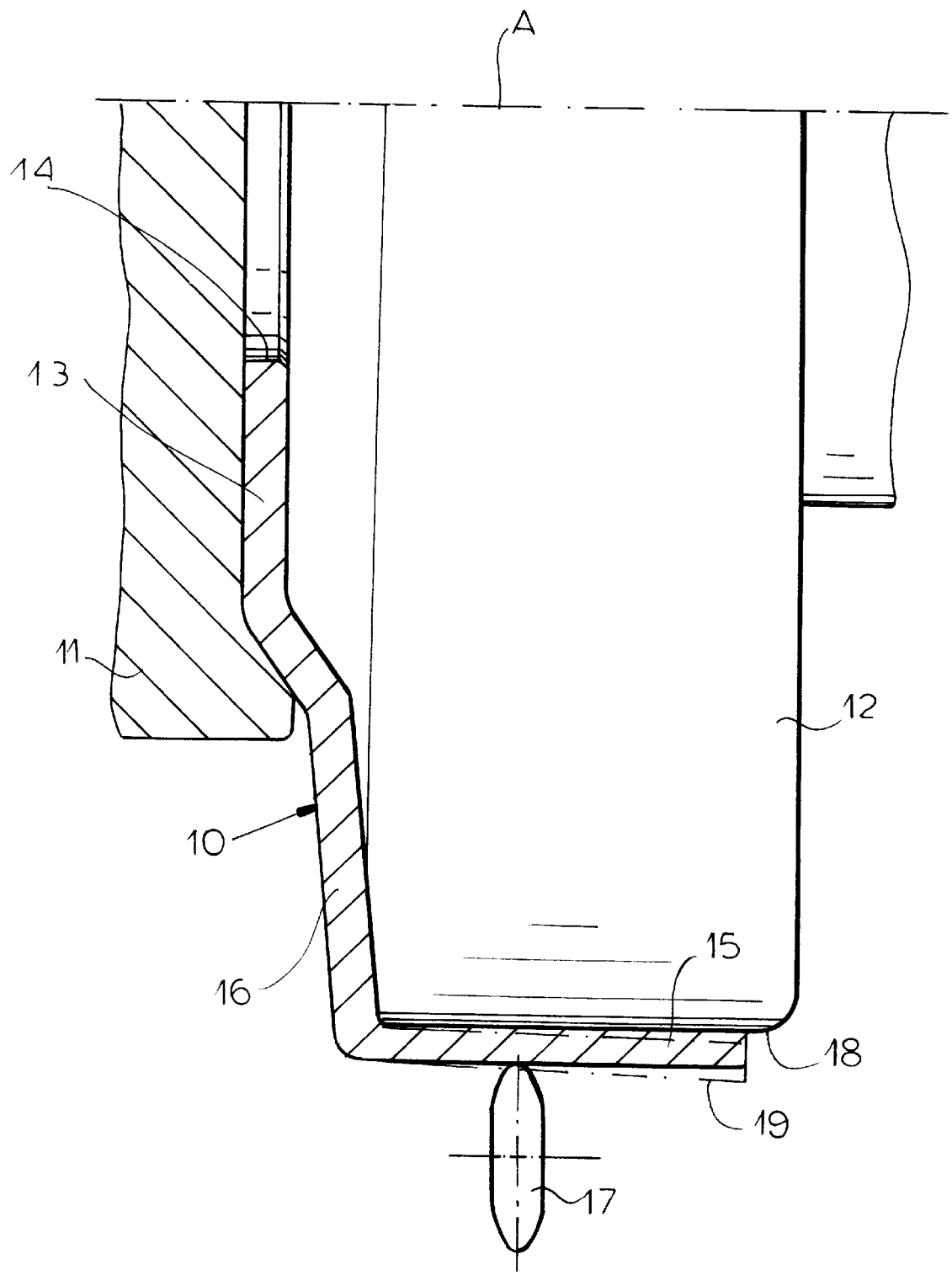

The present invention relates to a method of producing a road wheel for a track-laying vehicle such as a military vehicle, construction vehicle or agricultural vehicle and especially for the production of road wheels having a dished wheel member which is formed from a flat disk and is rotatably symmetrical, i.e. has axial symmetry.

BACKGROUND OF THE INVENTION

In U.S. Pat. No. 4,572,587, corresponding to EP 0 111 048 B1, a method of making a road wheel for the track of a track laying vehicle is described. The road wheels are those spaced along the vehicle which support the vehicle on the lower strand or run of the track and which support the upper run of the track.

In the aforementioned patent, the road wheel is described as being made from a disk of steel and to have an inner hub portion, an outer peripheral portion and a transition portion bridging between the hub portion and the peripheral portion.

The wheel body is generally cup shaped or dished and the dished blank can be formed from the planar disk by pressure rolling (roll pressing or flow pressing) or projection pressing. In these methods, like deep drawing, a cylindrical peripheral Another object of this invention is to provide a method of making a road wheel which will be free from the drawbacks of earlier units as fabricated by prior art techniques.

SUMMARY OF THE INVENTION

These objects are attained, in accordance with the invention, by first fabricating the dished wheel blank by the method previously described involving roll pressing and projection drawing, i.e. by deforming the originally flat disk to form a cylindrical peripheral portion around an internal form or die and pressing the intermediate portion which is to interconnect the peripheral portion and the hub portion, as previously to the desired size of the wheel blank. However, in accordance with the invention, before machining any part of the blank, we quench and temper the blank and then subject the quenched and tempered blank, which is of increased size because of the heat treatment, again to roll pressing and projection drawing to restore the original shape. Then the machining operation can be carried out.

More particularly, the method of making the road wheel for a track-laying vehicle comprises the steps of:

(a) shaping by roll pressing and projection drawing a planar disk of steel to a rotationally symmetrical dished wheel blank for the road wheel and having an inner hub portion, an outer peripheral portion and an intermediate portion bridging the hub portion and the outer peripheral portion;

(b) prior to machining of the inner hub portion and the outer peripheral portion, quenching and tempering the blank and thereby increasing a size of the blank;

(c) subsequent to quenching and tempering of the blank and prior to machining of the outer peripheral portion reshaping the blank by roll pressing and projection drawing to an original size of the blank; and (d) thereafter machining the inner hub portion and the outer peripheral portion to a final shape.

Tests have shown that by quenching and tempering the blank before machining and then subjecting the quenched and tempered blank to roll pressing and projecting drawing, the eccentricities in the original blank can be eliminated, the wheel blanks can be fabricated with an especially high degree of reproducibility in serial and mass production and, most importantly, the wheel blank which results has greater strength, durability and greatly increased useful life.

The road wheels fabricated according to the invention can be used for heavier tracked vehicles and at higher speeds than heretofore and it is even possible to eliminate the wear rings which have been required, for example, in EP 0 111 048 B1 to increase the wear resistance of the wheel.

It has been found to be advantageous, according to the invention, to roll press and projection draw the wheel blank after the tempering heat treatment against an internal die or tool which is identical to the one used for shaping the original

We claim:

1. A method of making a road wheel for a track-laying vehicle, comprising the steps of:

(a) shaping by roll pressing and projection drawing a planar disk of steel to a rotationally symmetrical dished wheel blank for said road wheel and having an inner hub portion, an outer peripheral portion and an intermediate portion bridging said hub portion and said outer peripheral portion;

(b) prior to machining of said inner hub portion and said outer peripheral portion, quenching and tempering said blank and thereby increasing a size of said blank;

(c) subsequent to quenching and tempering of said blank and prior to machining of said inner hub portion and said outer peripheral portion reshaping said blank by roll pressing and projection drawing to an original size of said blank; and (d) thereafter machining said inner hub portion and said outer peripheral portion to a final shape.

2. The method defined in claim 1 wherein the reshaping of said blank in step (c) is carried out on an inner tool identical to or of the same shape as an inner tool used for shaping in step (a).

3. The method defined in claim 1 wherein said disk is composed of a heat treatable steel containing at least 1% by weight chromium and at least 0.2% by weight molybdenum.

4. The method defined in claim 1 wherein the blank is quenched and tempered in step (b) to a strength of 1150 to 1250 N mm$^{-2}$.

5. The method defined in claim 1 wherein the blank is quenched and tempered in step (b) in a salt bath.

6. The method defined in claim 1 wherein the blank is quenched and tempered in step (b) in a vacuum furnace.

* * * * *